INVENTORS:
HERMAN SCHOLL;
VOLKER KADELBACH &
WOLFGANG REICHARDT

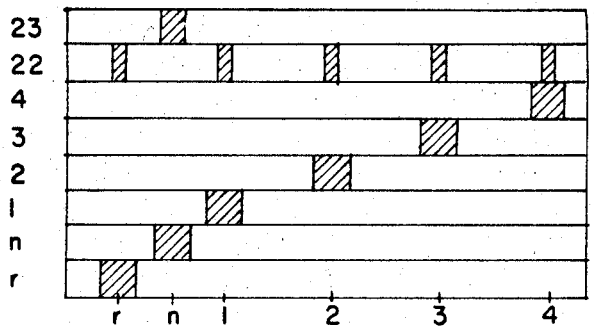
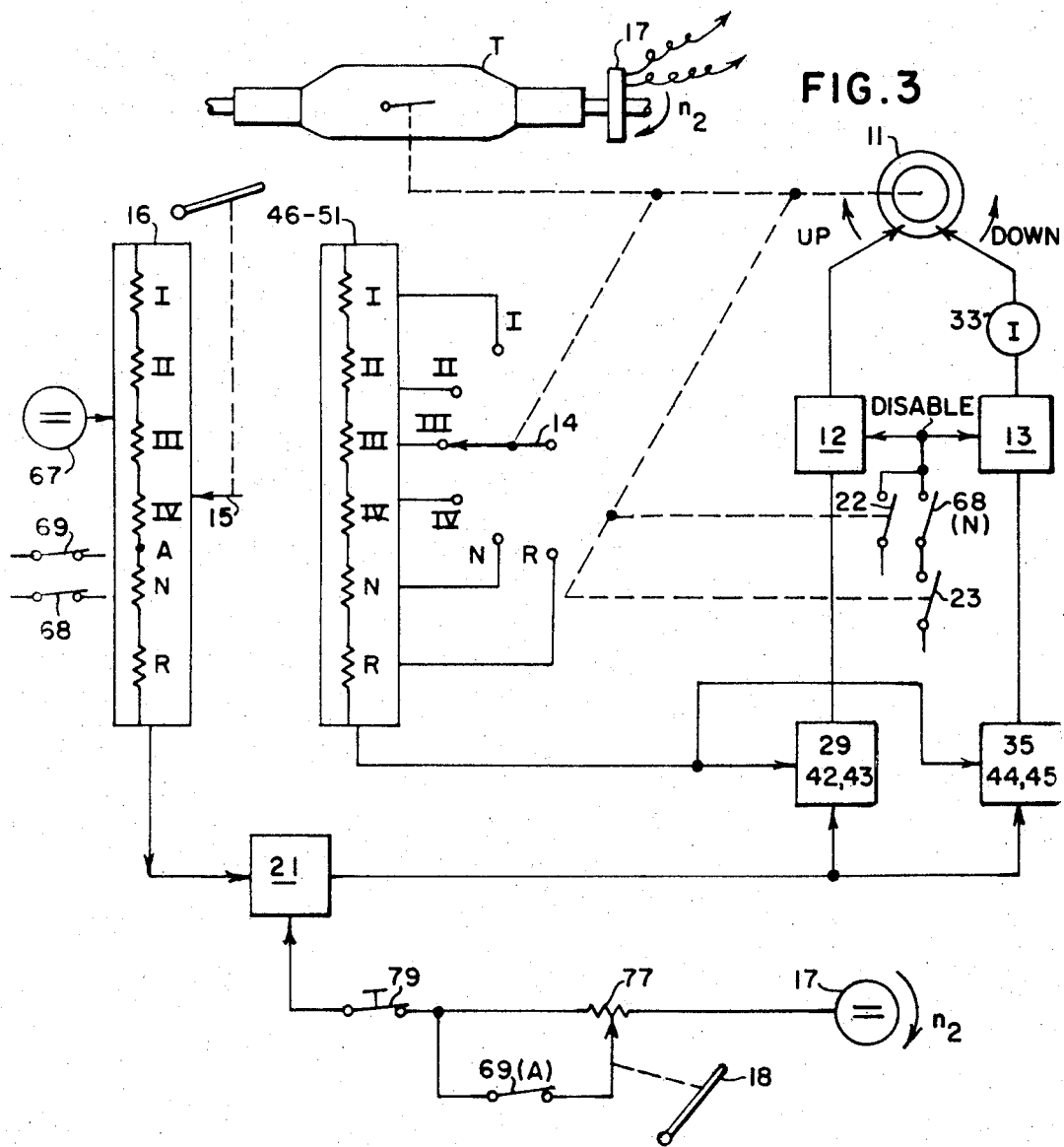
FIG.2
FIG.3

United States Patent Office 3,439,564
Patented Apr. 22, 1969

3,439,564
TRANSMISSION GEAR CHANGING CONTROL ARRANGEMENT, PARTICULARLY FOR MOTOR VEHICLES
Hermann Scholl, Stuttgart, Volker Kadelbach, Heutingsheim, and Wolfgang Reichardt, Stuttgart-Rohr, Germany, assignors to Robert Bosch GmbH, Stuttgart, Germany, a limited-liability company of Germany
Filed Feb. 7, 1967, Ser. No. 614,498
Claims priority, application Germany, Mar. 3, 1966, B 86,057
Int. Cl. F16h 5/42, 5/60
U.S. Cl. 74—866                    15 Claims

ABSTRACT OF THE DISCLOSURE

A first voltage is derived proportional to the setting of a gear selector; a second voltage proportional to the actual gear engaged; and a third voltage proportional to the output speed of the transmission; the various voltages are compared, and if the speed output voltage exceeds a certain limit, a gear shift motor is energized to shift the gear up, or down, as the case may be; the gear shift selector has standard transmission positions, and an automatic position, and disabling means are provided to prevent automatic up-shifting to obtain maximum engine braking under emergency conditions.

---

The present invention relates to a transmission gear-changing control arrangement, and more particularly to a control arrangement for combined automatic and manual transmissions in automotive vehicles, having a control selector lever to select a particular shift position.

Automatic shifts for automotive vehicles, shifting automatically when the output speed of the transmission exceeds a certain limit, are widely used. Such arrangements are simple to construct, but when an additional manual transmission control is desired, they become complicated. For reasons of safety, it is desirable that the driver can manually select a given gear; further, automatic transmissions are not always capable of changing gear just at the time when a good driver would do so.

Some automatic transmissions are so arranged, that the automatic shifting itself is limited by manual conrol, that is that, for example, a three-speed transmission will shift in only the two upper or two lower gears automatically and the other gear will remain disengaged. Such an arrangement is particularly desirable when utilizing the transmission in combination with the engine to obtain full motor braking when going steeply downhill. When driving over very winding roads, or, for example, taking sharp turns such as in mountainous and switch-back type roads, it is possible to prevent shifting of automatic transmission by control of the vehicle with the gas pedal. Thus, the transmission will not shift up and on a straighter stretch, the full braking effect of the motor can be utilized. Yet, such transmissions have the disadvantage that on slippery or icy roads, the full driver control is not possible. If, on slippery roads, the transmission shifts downwardly automatically, the vehicle may begin to skid. This cannot be prevented in the usual customary systems. Further, the ordinary automatic transmission, even with driver-override control, does not enable starting the vehicle in second, or even a higher gear, in order to reduce the driving torque on the wheels, and thus slipping or skidding.

It is an object of the present invention to provide a control arrangement for transmissions, and particularly for vehicle transmissions, which avoids the disadvantages of known arrangements.

Summary

Each transmission setting has a separate selected position of a control lever. Electronic switching devices are provided, which change the gear engaged into the next higher transmission stage, when the speed of rotation of the transmission exceeds a certain predetermined value. Thus, the driver has the possibility to change transmissions, as in an ordinary manual one at any desired time. The particular transmission is active at all times, which corresponds to the selector position. The only limitation on the driver's freedom is, that to protect the motor and the transmission, the final limit is provided which places the next higher gear in engagement when a certain limiting value of speed of rotation has been reached. Further, by changing to a lower gear, the gear will only engage in the lower range when the input speed of the transmission has been reduced to the safe limiting value.

Undesired gear-shifting can be avoided by setting the selector lever to a predetermined position. When going downhill, the particular range is selected in which the braking effect of the engine is best. The next higher gear will then be engaged only when the motor reaches a speed which exceeds a given limit by a predetermined amount.

The arrangement according to the present invention enables manual control, besides automatic control of the transmission. Thus, complete automatic shifting can be selected, for example for city driving, whereas for cross-country driving individual control by the driver is possible. This also enables full control under difficult driving conditions, for example in snow or ice.

Briefly, in accordance with the invention, the speed of rotation of the engine is sensed and a speed-output signal is obtained. A gear-position signal is obtained, having a unique characteristic (such as amplitude) depending on the particular gear selected. The speed-output signal and the gear-position signal are then compared, and the comparison signal is utilized to provide a control signal for an automatic gear-changing motor, changing the gear actually engaged to the one which corresponds to the proper value for the engine speed.

The structure, organization, and operation of the invention will now be described more specifically in the following detailed description with reference to the accompanying drawings, wherein:

FIG. 2 is a switch-timing diagram.

FIG. 3 is a highly schematic block diagram of the gear conrol arrangement.

Figure 1:
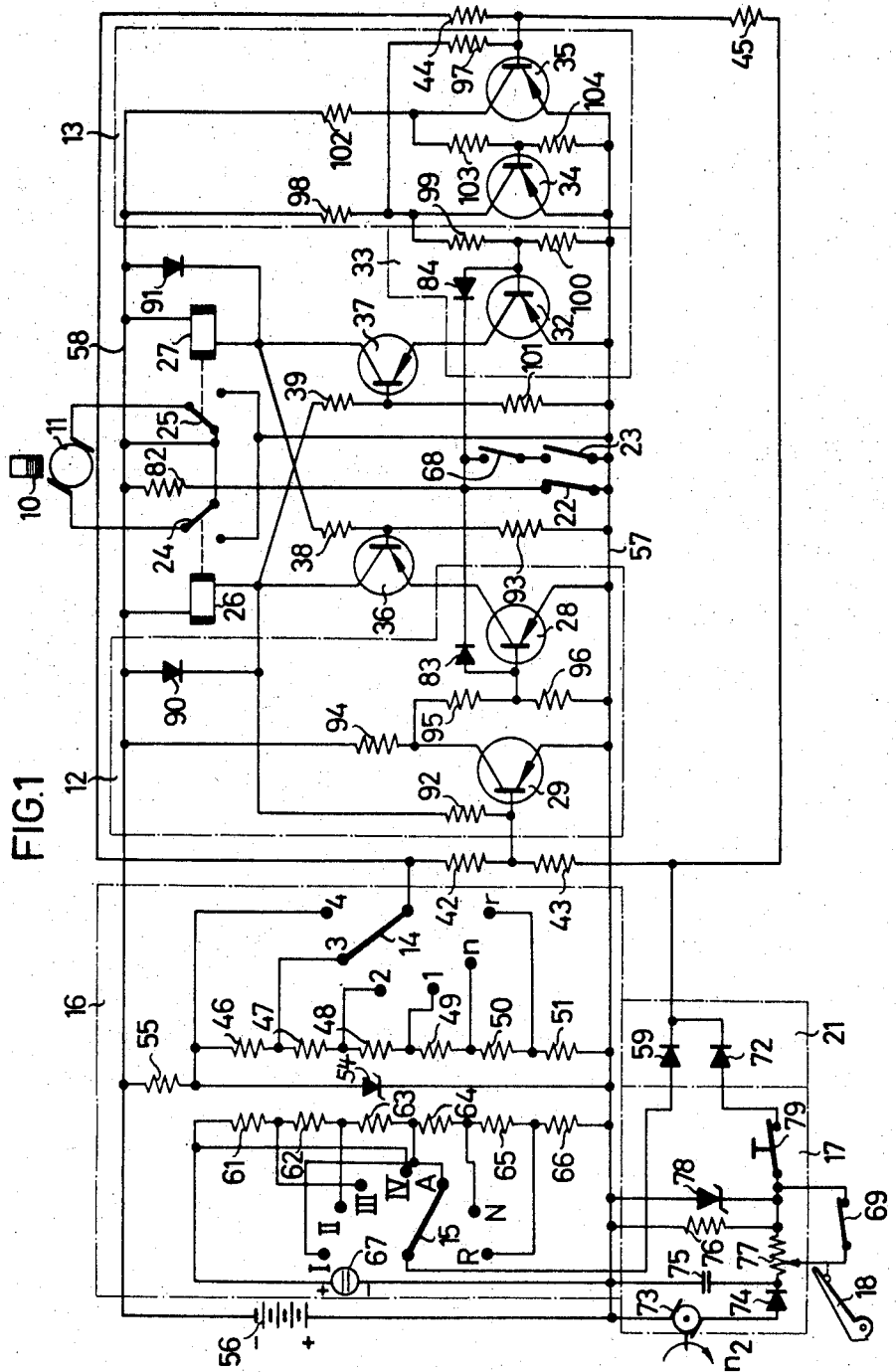
FIG. 1 is a circuit diagram of the control arrangement according to the present invention.

Referring now to the drawings, and in particular FIGURE 1: a switching motor having an armature 11, and energized by a permanent magnet 10 is controlled by a pair of voltage-sensitive transistor switching stages 12, 13. A switch, having a switch arm 14, which is coupled to the transmission (not shown) provides a potential which is unique, in amplitude, for any one of the transmission gears engaged—forward gears 1, 2, 3, 4, in neutral position n and the reverse position r. A manually operable selector lever 15 is likewise formed as a switch arm and provides a position potential, depending upon the position of the arm which may be with forward gears I, II, III, IV; an automatic position A, neutral, N and reverse, R. Jointly, the potentials provided by the switches 14, 15 form a source of potential 16. The output speed of rotation of the transmission, schematically indicated by arrow $n_2$ controls a source of potential 17, the amplitude of which depends on the speed of the transmission. Additionally, the output potential depending on the speed of transmission is, for the automatic (A) position of the selector lever 15 also dependent on the position of the fuel, that is gasoline control pedal 18. A voltage derived from voltage source 16 and speed-dependent voltage source 17, as modified by the position of the gas pedal 18 if applicable, is applied to a "larger than" unit 21, which has its output applied to the transistor switches 12 and 13 to control the one or the other of these switches.

Motor 11 drives the shift-linkage of the transmission. The particular drive arrangement, and linkages are not material and may have any form, well known in the art of automatic transmissions. In addition, motor 11 drives switch contact 14, and further controls a pair of contacts 22, 23. The timing of these contacts is illustrated in the diagram of FIGURE 2, in which the cross-hatched areas represent the time during which the contacts are closed. The relationship between the contacts r, n, 1, 2, 3, 4, and of the steps of the gearing of the transmission is fixed. Thus the switch 14, shown as a rotary switch, could also be replaced by a group of six limit, or end-operating, switches controlled directly by the linkages of the gear-change mechanism within the transmission. Motor 11 is controlled by the contacts 24, 25 of relays 26, 27. If neither of the transistor switches 12, 13 has become active, that is, has become conductive to place current through any one of the relays 26, 27, the relay contacts are connected by springs in their position shown in FIGURE 1, so that the armature circuit is short-circuited. Thus, the permanent magnetic field 10, together with the short-circuited armature, will hold the armature in position and further will cause fast braking of the motor without additional mechanisms when the relays 26, 27 disconnect.

Relay 26 is controlled by a p-n-p transistor 28, which, together with a p-n-p transistor 29 forms a voltage controlled flip-flop, similar to a Schmitt trigger circuit. Similarly, relay 27 is controlled by a p-n-p transistor 32, serving as an inverter stage 33 for the flip-flop formed by transistors 34, 35, together forming the circuit 13. Further, to provide mutually exclusive operation of the circuits 12, 13, a pair of transistors 36, 37 are provided, the bases of which are cross-connected to the collector of the other circuit over resistances 38, 39. These transistors, connected as shown, insure that at any time only one of the two relays 26 or 27 can be activated.

The inputs to circuits 12, 13 are connected to intermediate points on a pair of voltage dividers formed by resistances 42, 43 and 44, 45, respectively. One side of the voltage dividers 42, 43 and 44, 45, is connected to the common point of the switch arm 14, which, according to the particular position in which the transmission is engaged, is connected to one of the tap points r, n 1, 2, 3, and 4, of a voltage divider formed of series-connected resistances 46 to 51. The voltage divider formed of resistances 46 to 51 is connected to a source of potential which is stable. A Zener diode 54, connected over a resistance 55 is connected across the battery 56 of the vehicle, such that the cathode of the Zener diode is connected to the positive terminal of battery 56, which supplies a positive bus 57, and the anode of the Zener diode is connected via the resistance 55 to the negative terminal, that is the minus bus 58 of battery 56.

The "greater than" Unit 21, which may be thought of as an analog-type OR-gate consists of a pair of diodes 59, 72. The output from this unit 21 connects to the other side of the voltage divider formed of resistances 42, 43, and 44, 45. The selector lever, forming switch 15 has seven tap points connected to a voltage divider, formed of resistances 61 to 66. The 7 taps are indicated as R (reverse), N (neutral), A (automatic), IV (fourth gear), III (third gear), II (second gear), and I (first or lowest gear). The negative pole of the voltage divider formed of resistances 61 to 66 is connected to the positive bus 57 of the main supply; a stabilized source of direct current has its negative terminal connected to the positive bus 57, and its positive terminal to the other side of the voltage divider, that is to resistance 61. Seen in FIGURE 1, the tap point corresponding to the automatic position A is electrically at the same position as the switch position I (first or lowest gear) so that both the position A and position I for switch 15 are connected to the same point, that is between resistances 63, 64. Of course, the selector switch 15 need not be a rotary switch as shown in the drawing; it could be a push-button selector. The selector 15 further controls a pair of contacts 68, 69. Switch 68 will close when the switch-contact 15 is placed in the neutral, N, position; Switch 69 will be closed when the switch-contact 15 is placed in the automatic, that is A, position.

The speed-responsive source of direct current source 17 consists of an AC generator 73, connected to the output of the transmission, so that its potential will be proportional to the speed of rotation of the transmission as applied to the wheels of the vehicle. The AC voltage from generator 73 is rectified by a diode 74 and smoothed by a condenser 75. A voltage divider formed by resistances 76, 77 is in parallel with the condenser 75. One side of the voltage divider, as one side of the source 17, is connected to the positive bus 57. The slider of potentiof the voltage divider, resistance 77 is formed as a potentiometer having a sliding contact. In parallel to resistance 76 is a Zener diode 78, the cathode of which is connected to the positive bus 57. The slider of potentiometer 77 is mechanically connected to the gas pedal 18, that is to the fuel control of the engine, in such a manner that when the engine is idling, the slider is at the side of potentiometer 77 which is next to diode 74, whereas at full throttle opening, it will be at the other side of the potentiometer 77. Thus, when the engine is idling, a maximum voltage will be taken off across resistance 77, and at full speed the voltage will be small. The slider is connected over a contact 69 with the junction of resistances 76, 77; a manually operated switch 79 then connects to one side of a coupling diode 72 in unit 21, the other side of which connects in parallel to diode 59.

The contact 23, operated by motor 11, and previously referred to, is connected on one side to the positive bus 57, and on the other in series with the switch 68, which is normally open, and closed only when selector lever 15 is placed in the neutral position. Then contact 22, likewise operated by motor 11, is in parallel to the two series switches 23, 68. In series with this parallel connection is a resistance 82, connected to the negative bus 58 of the vehicle. The junction of resistance 82 and the parallel switch arrangement is connected to a pair of diodes 83, 84, oppositely poled. Diode 83, in turn, connects to the base of transistor 28 and diode 84 to the base of transistor 32 of the inverter stage 33.

Relays 26, 27 have a pair of clipping diodes 90, 91 connected in parallel therewith, to clip the peaks upon interruption of current through the relay coils and to prevent damage to the transistors in the system.

The emitters of transistors 28, 29 and 32, 34, 35, are each, respectively, connected to the positive bus 57. The base of transistor 29 is connected over a resistance 92 with the collector of transistor 36. The base of transistor 36 is connected over a resistance 93 back to the positive bus 57. The collector of transistor 29 is connected over a collector resistance 94 with the negative bus 58, and over a coupling resistance 95 to the base of the transistor 28, which in turn is connected over a resistance 96 back to the positive bus 57. The base of transistor 35 is connected over a feedback resistance 97 to the collector of transistor 34 which, in turn, is connected over its collector resistance 98 to the negative bus 58. A coupling resistance 99 connects the collector of transistor 34 to the base of the transistor 32 of the inverter stage 33, and further over a resistance 100 to the positive bus 57. The collector of transistor 28 is connected to the emitter of transistor 36. The collector of transistor 32 is connected to the emitter of transistor 37. The base of the transistor 37 is connected over resistance 101 with the positive bus 57. The collector of transistor 35 is connected over its collector resistance 102 with the negative bus 58 and over a coupling resistance 103 with the base of transistor 34, which in turn is connected over a resistance 104 with the positive bus 57.

Before considering the operation of the circuit just described, the functions of the various positions of the selector 15 will be referred to. The following selection positions are possible:

Automatic (A).—This is the normal position for driving. Gear shifting is automatic and depends on the speed of the vehicle and the position of the throttle.

Neutral (N).—No gear is engaged. The transmission linkage is, as well known in the art, in the position between low (first gear) and reverse. The transmission will actually switch into neutral only when the speed of the vehicle is below a predetermined minimum, for example about 6 miles per hour, as will appear below.

Reverse (R).—It is possible to place the transmission in reverse only when the speed of the vehicle is very low, for example about 3 miles per hour.

Forward gears I–IV.—In this position, gear-shifting is controlled manually by the driver, subject to limitations built into the system to prevent vehicle damage. It is not possible to keep the transmission in a gear which will cause the motor to turn beyond a predetermined design value. For example, if the selector is in position II, that is if the selector commands the second gear, and the vehicle is stationary, the second gear will be engaged. If, however, upon driving, the upper limit of the r.p.m. of the motor is exceeded, the transmission will shift automatically into third gear. If upon further acceleration, the designed speed for third gear is again exceeded, the fourth gear will automatically follow.

If, at high speed and in a high, direct transmission, the selector switch is brought into a position corresponding to a lower gear, then the actual shifting will occur only when the speed of the vehicle has been reduced to such an extent that, for the selected lower gear, the speed of the engine does not exceed its maximum designed value.

*Operation*

Let it be assumed that the selector switch 15 is in the position A, that the speed of the vehicle, as determined by the position of gas pedal 18, corresponds to the third gear, and that the third gear is actually engaged. Thus, that the position of switches 15 and 14 is as shown in FIGURE 1.

The voltage dividers 42, 43, and 44, 45 have a voltage division ratio which is so arranged, that transistor 29 will just be conductive, and transistor 35 will just be blocked. Thus, transistor 28 will be blocked, transistor 34 will be conductive and the transistor 32, functioning as an inverter stage, will then be blocked. Further, diode 72 will be conductive and diode 59 will be blocked.

If the speed of the vehicle increases, without change of position of the gas pedal 18, for example when going downhill, the voltage of source 17 will increase due to increase of speed of the generator 73, so that the potential of the junction of the output from unit 21 will shift in a positive direction. As the potential becomes more positive, transistor 29 will block; transistor 28 will become conductive. Since the transistor 36 already has a negative potential on its base, as determined by the resistances 38, 93, it becomes conductive, current will flow through relay 26 and contact 24 will switch over to the position not shown in FIG. 1. The switching motor 11 will be energized in a direction to turn to cause change of the transmission from third to fourth gear. At the same time, transistor 37 will be blocked due to the cross connection of its base over resistance 39.

Shortly after motion of the switching motor 11 starts, switch 22 opens (see diagram of FIG. 2). Transistor 28 is held conductive over diode 83; likewise transistor 32 retains its conductive state by the connection to diode 84. Transistor 37 will remain blocked, and relay 27 in the position shown in FIG. 1, although transistor 32 is conductive, due to the aforementioned connection over resistance 39. Contact 68, as previously mentioned, will remain open as shown in FIG. 1; it closes only when selector switch 15 is in the N-neutral position.

As the switching motor 11 turns, contact 3 of the switch 14 opens, and contact 4 will be closed (see FIG. 2). When contact 4 closes, the potential on the base of transistor 29 will shift in a negative direction with respect to the potential of the positive bus 57, and transistor 29 will again become conductive. Transistor 28 will still, however, be conductive because it is retained in its conductive state over diode 83 and resistance 82. Only, just before the final gear position is reached, contact 22 will close. Then, transistor 28 will block, relay 26 will revert to the position shown in FIG. 1, short-circuiting the armature circuit of the switching motor 11 which stops rapidly.

Shifting downwardly is similar; as the speed of the vehicle decreases, the potential of the junction of diodes 59, 72 will shift in negative direction (with respect to the potential of bus 57). When a predetermined speed is reached, that is when the potential of the junction 59, 72 becomes sufficiently negative with respect to bus 57, transistor 35 becomes conductive, blocking transistor 34, and rendering transistor 32 of the inverter stage conductive. Transistor 37, already having a negative base potential supplied over resistances 39, 101 becomes conductive, energizing relay 27 which causes the relay switch to operate and thus motor 11 to turn, but in a direction opposite to that when shifting up. At the same time, transistor 36 is blocked due to the cross connection over resistance 38. Transistors 36 and 37, with their resistances 38, 39 thus serve as a lock against inadvertent simultaneous operation of both relays. All other transistors will be energized in a manner similar to that explained in connection with shifting up.

If the vehicle brakes are used and the speed of the vehicle decreased, the transmission will shift downwardly, automatically through to the first gear. It will not shift into neutral, or reverse. This is achieved by proper dimensioning of the resistances of voltage divider 61 to 66. The voltage dividers are so arranged that the junction between resistances 63, 64 (A and I-gear position) places a potential on diode 59 of such a value that diode 59 becomes conductive and thus maintains a certain potential at the output from unit 21, even though very little voltage is obtained from unit 17, that is generator 73. Diode 72 will be blocked. Thus, the potential applied to the voltage dividers 42, 43, and 44, 45 is limited to a predetermined minimum value.

If the selector is placed in the neutral, N, position, then the transmission will shift downwardly but will be placed into neutral only when the speed of the vehicle is so small, for example 6 m.p.h., that diode 72 becomes blocked. Since, simultaneously with the switching of the arm 15 to the N position, contact 68 closes, the switching motor 11 will stop rapidly after a few revolutions, when contact 23 has closed (see FIG. 2). These contacts, being parallel with contact 22, will block transistor 28 to cause disconnecting relay 27, and thus short-circuiting of the armature of motor 11.

The reverse, R, position of the selector 15, causes shifting into reverse. This command can be carried out automatically only when the speed of the vehicle is so small that the diode 72 is blocked.

The driver can also manually control the position of the transmission, for example for cross-country driving, by placing the selector in the positions I to IV. If the vehicle is stopped, or has a very low speed, any gear can be selected. It is, however, not possible to exceed a safe, or design value of speed of the engine, because the potential of the generator 73 will become active over diode 72. If, in any particular gear, the upper value of speed of the engine is reached, diode 72 will become conductive and diode 59 will block. It is to be noted, that in the switch positions I to IV of selector 15, contact 69 is open, so that the motor can be controlled to its limit of performance by the gas pedal. If, however, the diode 72 does become conductive, the gear will change automatically to the next higher position, as under automatic operation. No harm will be done when, with high speed, a transmission which is too low for the speed, is selected. Since the potential of the junction of diode 59 and 72 is retained at a high positive value, shifting downwardly will occur only, as in automatic operation, when a safe motor speed has been reached. It is also harmless to put the selector lever in reverse, even at high forward speed. Until the speed of the vehicle has dropped so that the potential at diode 72 does not exceed that of diode 59, the actual shift mechanism, that is the carrying out of command by the motor 11, will not follow the manual command.

In case of emergency, for example if the brakes should fail when going steeply downhill, it may be desirable to retain a certain low gear, without any up-shifting regardless of strain on the engine. Contact 79, manually operated and in series between the voltage divider resistance 77, and diode 72 is provided. This switch is opened, so that the output of unit 21 will then be only that applied from voltage divider 61–66, that is the output from diode 59, the potential of which is determined by the manual position of the selector lever. Should the selector lever be in automatic position, the transmission will shift down automatically to first gear.

In order to prevent operation of relay 26, and thus switch 24 when the highest speed, IV, has already been reached, the potential obtained from source 17, that is from generator 73 must be limited to a predetermined value. Zener diode 78 provides this limitation. It could be replaced by an ordinary diode, the cathode of which is connected to another voltage divider in parallel with source 67, and the anode of which would be connected to the junction of resistance 76 and potentiometer 77 or by other limit means.

Some vehicles have interlocks between the transmission and the carburetor or the clutch mechanism. Such interlocks can readily be applied either to the transmission mechanism itself, or can be coupled to the switch 22 which, in turn, is coupled to the transmission or to its operating motor 11. As another alternative, the junction between diodes 83, 84 can be connected to the base of a transistor, the collector circuit of which has a relay which controls auxiliary interlock mechanisms.

The selector switch contacts, or other contacts, can be replaced by solid state switches; for the switches 22, 23, 68, 69 connected to the transmission, or the selector 15, respectively, inductive switches, mercury-type tip switches, magnetic switches or the like can be used. The relays 26, 27 can be replaced by solid state devices, such as power transistors, in combination with a suitable motor 11, such as a motor having a pair of separate field windings.

The "park" position for an automatic transmission has not been shown in the present drawings, since usually a mechanical interlock will be provided to lock the transmission. The transmission itself may be of standard design, and have three, or four forward speeds, as desired. If only three forward speeds are used, one less resistance in the voltage dividers 46–51 and 61–66 will become necessary, with suitable dimensioning.

The shift control arrangement according to the present invention thus enables starting in a gear other than the lowest one, while still retaining the flexibility of automatic upshifting, either by placing the selector lever 15 into the automatic position (which, after having started in a numbered gear, will close switch 69) or utilizing manual shifting by placing the selector lever then in the highest gear and rely on up-shifting in accordance with the speed of the vehicle. The possibility to place the transmission into a lower gear, if the speed drops, but otherwise to maintain it in the highest gear has advantages when overtaking. For example, if the selector lever 15 is placed into the automatic, or first gear position, then the lowest possible transmission will be engaged, commensurate with the speed of the vehicle. This lowest-most gear, giving the best acceleration, will remain engaged even though the speed of the vehicle itself has to be decreased abruptly, for example due to oncoming vehicles, during which time the fuel control pedal 18 will be in the idle position.

In case of emergency, the driver only need place the first gear into engagement and then manually open switch 79. Automatic switching will be inhibited regardless of the speed of the engine, thus affording maximum engine braking.

The operation of the invention can also be briefly described in connection with a block diagram. The manual selector 15 controlling the source of potential 16, supplied by direct current source 67 is schematically indicated. The output from source 16 is applied to the analog-OR gate 21, which receives its potential from source 17 (proportional to the output speed of the transmission) over potentiometer 77, when in manual position and as modified when in the automatic position, that is when switch 69 is closed. Emergency switch 79 is also indicated.

The output of analog-OR unit 21 is compared with the voltage obtained from the actual gear position, that is from the voltage divider formed by resistances 46–51 as indicated by the arrows applied to the blocks labelled 29, 42, 43 and 35, 44, 45. The transistors 29, 35, respectively act as comparators, comparing the relative value of the output from unit 21 with the voltage obtained from the actual position of the transmission, as determined by selector 14. The interconnection of the selector 14 with the actual transmission, shown at T is indicated by dashed lines.

If there is a mismatch between the voltage from unit 21, and the voltage determined by selector 14, that is by the transmission position, which exceeds a certain value, the comparator formed of transistors 29 and voltage dividers 42, 43; or of the comparator formed of transistor 35 and voltage dividers 44, 45 will be energized. If the mismatch tends in one direction, unit 29, 42, 43 will respond; if the mismatch tends in the other direction, unit 35, 44, 45 will respond.

Either one of circuits 12, 13 will then be energized which in turn will energize the motor 11 to turn in one, or the other direction to either cause shifting up, or shifting down. To invert the output of circuit 13, inverter 33 is shown connected to circuit 13.

As clearly appears from the diagram, switch 22 is operated during the operation of the motor 11; likewise, operation of control triggers 12, 13 can be disabled by closing of switch 68 when the selector is in neutral position and switch 23 which will be controlled by the motor 11 as the gears are being shifted.

The above diagram thus clearly illustrates that the shift operation depends not only on the desired selection of the transmission gear range, but also on the actual speed of the output of the transmission from unit 17. This output speed is compared with a signal determined by the mode of operation (that is, automatic (A) or specific desired gear selection) and a further comparison is made of the signal derived therefrom with a signal determined by the actual gear range which is engaged.

We claim:

1. In a transmission control arrangement, for a transmission having sequential speed ratio steps adapted to be connected to a drive means, having a gear selector (15) movable into different gear selector positions (I, II, III, IV; A, N, R), means sensing the speed of rotation (17, 73) of said drive means to which the transmission is connected and providing an electrical speed output signal therefrom as a measure of said speed;

electrical means (16; 61–66) coupled to said gear selector (15) providing a gear-position signal having a unique characteristic for each gear position; means comparing (21) said speed output signal and said gear-position signal and generating a gear-change signal when the difference between said signals exceeds a predetermined value; and electrically controlled (12, 13) gear-change means (11) connected to the transmission to cause progressive stepping of said transmission, said gear change means being controlled and energized by said gear-change signal to change the gear engaged in said transmission to the next adjacent gear step when the speed of rotation of said drive means, and thus said speed output signal, and said gear position signal have a difference which exceeds said predetermined value.

2. Transmission as claimed in claim 1, wherein one of said gear selection positions is an automatic gear-change position (A) and said other selection positions are a plurality of manually settable gear selection positions (I, II, III, IV, N, R); said electrical means providing identical gear position signals for said automatic position and one of said manually settable gear selection positions.

3. Transmission as claimed in claim 1, wherein said electrical means providing a gear position signal (61–66, 67) includes a source of potential (67) and a voltage divider (61–66) having a plurality of taps, a tap each being assigned to each gear position, whereby said unique characteristic will be a predetermined potential.

4. Transmission as claimed in claim 1, including a pair of transistor switches (12, 13) connected to energize said gear-change means (11), one of said switches (12) being active for changing gears upwardly upon increase of drive means speed and the other for changing gears downwardly upon decrease of drive means speed; said transistor switches (12, 13) being selectively energized in dependence upon said gear-change signal.

5. Transmission as claimed in claim 4, wherein said comparing means (21) includes a "larger than" unit (59, 72); and the speed sensing means (17, 73) senses the output speed of said transmission; one of said transistor switches (12) being connected to said "larger than" unit to be energized when said output signal exceeds the gear-position signal.

6. Transmission as claimed in claim 5, wherein said drive means is an automotive engine; a variable resistor (77) is provided connected in circuit with said speed sensing means (73) and coupled to the fuel control (18) for said engine in such manner that, upon increase of supply of fuel, the output signal from said speed sensing means (73) is attenuated; and means selectively disabling said variable resistor in dependence on the position of said gear selector (15).

7. Transmission as claimed in claim 4, including a holding circuit contact (22) associated with said gear-changing means (11) to maintain the respective transistor switch (12, 13) in its initial condition of energization during gear changing.

8. Transmission as claimed in claim 1, including a Zener diode (78) connected in circuit with said speed sensing means (17) to limit the maximum value of the speed output signal.

9. Transmission as claimed in claim 1, including a safety cut-off switch disabling application of said speed output signal to said comparing means whereby only the unique characteristic of said gear-position signal will be effective to control the gear-change means (11) and the gear to be engaged will be controlled by the position of said gear selector (15).

10. Transmission as claimed in claim 1, including a second source of potential having a plurality of discrete values (56, 55, 54; 46–51), each assigned (14) to a gear ratio of said transmission; a second comparator (42, 43; 44, 45) connected to have as one input a potential assigned to the gear actually engaged in said transmission and further to have as another input said gear-changing signal; said electrically controlled (12, 13) gear-changing means (11) being energized when the difference between said pair of inputs to said second comparator exceeds a predetermined value.

11. Transmission as claimed in claim 10, wherein said second source of potential includes a voltage divider having a plurality of resistors (46–51) and tap points; and said second comparator includes a pair of voltage dividers (42, 43; 44, 45) of different voltage division ratios, one voltage division ratio being assigned to shifting-up operation and the other ratio to shifting-down operation.

12. Transmission as claimed in claim 11, wherein said electric control for said gear-changing means includes a pair of transistor switches (12, 13); one each transistor switch being connected to one each of said voltage dividers (12; 42, 43; 13; 44, 45); and an inverter is connected to the transistor switch (13) assigned to the downshift operation.

13. In a control for an automotive vehicle transmission having a gear selector (15) movable to different shift positions, the improvement comprising:

first electrical means (16; 61, 66) associated with said gear selector (15) and providing a gear-selection signal having a characteristic unique for each selected gear position;

second electrical means associated with the transmission of said vehicle and providing a gear-position signal having a characteristic unique for each gear position;

a generator (17–73) providing a speed signal having a characteristic proportional to output speed of said transmission;

a first comparator (21) connected to have the speed signal and the gear-selection signal applied thereto and providing an output signal determined by whichever is larger; a second comparator (29, 42, 43; 35, 44, 45) connected to compare said output signal and said gear-position signal, said second comparator providing a first control signal (12; 26, 36 ON) when said output potential and said gear-position potential differ by a first value, and supplying a second control signal (13; 27, 37 ON) when said output potential and said gear-position potential differ by a second value; and gear-change means (11) selectively controlled by said first or said second control signals to change gears of said transmission, and with it said gear-position signal in a direction to reduce the differences between said output signal and said gear-position signal below said values.

14. Automotive vehicle transmission control as claimed in claim 13, wherein said first electrical means is a first voltage divider (61–66) providing a gear-selection potential; and said second electrical means is a second voltage divider (46–51) providing a gear-position potential; and said speed signal provided by said generator is a potential proportional to output speed of said transmission.

15. Automotive vehicle transmission control as claimed in claim 14, wherein said gear selector has predetermined manual gear positions (I, II, III, IV), an automatic position (A) and neutral and reverse positions (N, R); and wherein the voltage divison ratio of the lowest gear position (I) and the automatic position (A) is the same; a variable attenuator (77) coupled to the fuel control of the engine for said vehicle, said variable attenuator

(77) being inserted in circuit with said generator (17, 73) providing said speed potential when said gear selector is in automatic position.

References Cited
UNITED STATES PATENTS

| | | | |
|---|---|---|---|
| 2,995,949 | 8/1961 | Gelenius et al. | 74—336 X |
| 3,052,134 | 9/1962 | Worster | 74—336 X |
| 3,335,830 | 8/1967 | De Castelet | 74—365 X |
| 3,267,762 | 8/1966 | Reval | 74—365 |

DONLEY J. STOCKING, *Primary Examiner.*

T. C. PERRY, *Assistant Examiner.*

U.S. Cl. X.R.

74—336, 365, 752